United States Patent
Kobussen et al.

(10) Patent No.: US 10,980,245 B2
(45) Date of Patent: Apr. 20, 2021

(54) METHOD AND DEVICE FOR DEHYDRATING CO-EXTRUDED FOOD PRODUCTS

(71) Applicant: Marel Meat B.V., Boxmeer (NL)

(72) Inventors: Jos Kobussen, Indianola, IA (US); Marcus Bernhard Hubert Bontjer, Aarle Rixtel (NL); Kasper Willem Van den Berg, Oss (NL); Hector Angel Flores, Johnston, IA (US)

(73) Assignee: MAREL MEAT B.V., Boxmeer (NL)

( * ) Notice: Subject to any disclaimer, the term of this patent is extended or adjusted under 35 U.S.C. 154(b) by 0 days.

(21) Appl. No.: 14/554,952

(22) Filed: Nov. 26, 2014

(65) Prior Publication Data

US 2015/0086683 A1    Mar. 26, 2015

Related U.S. Application Data

(63) Continuation of application No. 10/598,687, filed as application No. PCT/NL2005/000164 on Mar. 7, 2005, now abandoned.

(30) Foreign Application Priority Data

Mar. 9, 2004   (NL) .................................... 1025670

(51) Int. Cl.
| | | |
|---|---|---|
| *A23B 4/02* | (2006.01) | |
| *A22C 11/00* | (2006.01) | |
| *A22C 13/00* | (2006.01) | |
| *A23B 4/24* | (2006.01) | |
| *A23B 4/30* | (2006.01) | |
| *A23B 4/033* | (2006.01) | |

(52) U.S. Cl.
CPC ............... *A23B 4/02* (2013.01); *A22C 11/00* (2013.01); *A22C 13/0006* (2013.01); *A23B 4/033* (2013.01); *A23B 4/24* (2013.01); *A23B 4/305* (2013.01); *A22C 2013/0023* (2013.01); *A23V 2002/00* (2013.01)

(58) Field of Classification Search
CPC ............... A22C 11/00; A22C 13/0006; A22C 2013/0023; A23B 4/02; A23B 4/033; A23B 4/24; A23B 4/305; A23V 2002/00
See application file for complete search history.

(56) References Cited

U.S. PATENT DOCUMENTS

| | | |
|---|---|---|
| 3,073,702 A | 1/1963 | Havard et al. |
| 3,444,078 A | 5/1969 | Erskine |
| 4,060,026 A | 11/1977 | Lohr et al. |

(Continued)

FOREIGN PATENT DOCUMENTS

| | | |
|---|---|---|
| EP | 0882403 A2 | 12/1988 |
| WO | 2004087586 | 10/2004 |

OTHER PUBLICATIONS http://tristate.apogee.net/et/ewtwaca.asp, Activated carbon Absorption and Adsorption, p. 1.

(Continued)

*Primary Examiner* — Erik Kashnikow
*Assistant Examiner* — Preston Smith
(74) *Attorney, Agent, or Firm* — Workman Nydegger

(57) ABSTRACT

A method for at least partially dehydrating the casing of co-extruded food products, wherein an aqueous salt solution is supplied to the exterior of the co-extruded food products. A device for at least partially dehydrating the casing of co-extruded food products.

7 Claims, 2 Drawing Sheets

(56) References Cited

U.S. PATENT DOCUMENTS

| | | | |
|---|---|---|---|
| 4,094,237 A | | 6/1978 | Riordan |
| 4,536,313 A | | 8/1985 | Hignett et al. |
| 5,173,190 A | * | 12/1992 | Picek .................... B01D 17/02 |
| | | | 210/259 |
| 5,632,153 A | * | 5/1997 | Ricklefs .................. A23B 4/06 |
| | | | 426/649 |
| 5,695,800 A | * | 12/1997 | Merritt, II .......... A22C 13/0013 |
| | | | 264/186 |
| 5,783,237 A | | 7/1998 | Sanderson et al. |
| 5,997,919 A | | 12/1999 | Kobussen et al. |
| 6,054,155 A | | 4/2000 | Kobussen et al. |
| 6,099,659 A | * | 8/2000 | Tacito .................... B29B 17/02 |
| | | | 134/10 |
| 6,245,369 B1 | * | 6/2001 | Kobussen .......... A22C 11/0254 |
| | | | 425/140 |
| 7,357,953 B1 | | 4/2008 | Van Den Dungen et al. |
| 2003/0183092 A1 | | 10/2003 | Barber et al. |
| 2005/0161376 A1 | * | 7/2005 | Heidbreder ............. A23B 4/02 |
| | | | 210/90 |

OTHER PUBLICATIONS

Glenn Michael Roy, Activated Carbon Applications in the Food and Pharmaceutical Industries, CRC Press, 1994, p. 158.
http://en.wikipedia.org/wiki/Peracetic_acid, Peracetic Acid, p. 1 & 2.
Garrido et al., The Recycling of Table Olive Brine Using Ultrafiltration and Activated Carbon Adsorption, Journal of Food Engineering, vol. 17 No. 4, Abstract.

* cited by examiner

METHOD AND DEVICE FOR DEHYDRATING CO-EXTRUDED FOOD PRODUCTS

CROSS REFERENCE TO A RELATED APPLICATION

This application is a continuation of U.S. Ser. No. 10/598,687 filed May 29, 2007, which claims priority of the PCT/NL2005/000164, which claims the priority of Netherlands Application 1025670 filed Mar. 9, 2004.

BACKGROUND OF THE INVENTION

The invention relates to a method for at least partially dehydrating the casing of co-extruded food products, wherein an aqueous salt solution is supplied to the exterior of the co-extruded food products. The invention also relates to a device for at least partially dehydrating the casing of co-extruded food products comprising: a brining system for co-extruded food products, supply means for an aqueous salt solution connecting onto the brining system and collecting means for the aqueous salt solution likewise connecting onto the brining system.

In the co-extrusion of food products the dough is extruded from a nozzle such that a dough strand is formed. Simultaneously with the extrusion of the sausage strand a skin (casing) is arranged around the dough strand, likewise by means of extruding a material suitable for the purpose, usually a collagen (often used in combination with a cross-linker or a liquid smoke extract added to the collagen for manufacturing the casing). Meat products (particularly sausages) are thus manufactured by means of simultaneous extrusion (co-extrusion), but it is likewise possible in this manner to manufacture vegetarian products with a non-animal casing. The material with which the casing is manufactured is viscous immediately after being arranged around the meat strand. In order to impart strength to the casing so that subsequent treatment and processing steps are possible, it is desirable to extract water from the casing as quickly as possible such that it cures.

For this purpose the co-extruded food product is brought into contact with an aqueous salt solution (also referred to as "brine", which usually consists of a solution of dipotassium phosphate in water), see for examples U.S. Pat. Nos. 5,843,504 and 5,989,609. For a more detailed description of the possible composition of such an aqueous salt solution, reference is for instance made to U.S. Pat. No. 6,054,155 and WO 0141576. The aqueous salt solution can also be provided with one or more additives, for instance "liquid smoke" and/or a preparation for accelerating the curing. The existing process of extracting moisture from the encased food products dilutes the aqueous salt solution such that after some use the diluted aqueous salt solution has to be replaced. The aqueous salt solution can also become contaminated with liquid smoke and meat product components during processing. This replacement of the aqueous salt solution represents an overhead cost, wherein it is furthermore noted that costs are usually associated with the discharge of contaminated aqueous salt solution.

The object of the present invention is to provide a method and a device for limiting the waste flow resulting from the dehydration of the casing of co-extruded food products. It is also an object to make the dehydration of the casing of co-extruded food products less expensive.

BRIEF SUMMARY OF THE INVENTION

To this end the invention provides a method for at least partially dehydrating the casing of co-extruded food products, comprising the processing steps of: A) supplying an aqueous salt solution to the exterior of the co-extruded food products, B) collecting the aqueous salt solution used during processing step A), C) reconditioning the collected aqueous salt solution, and D) reusing the reconditioned aqueous salt solution with the processing step A). As a result of dehydrating the co-extruded food products the salt concentration in the solution will decrease under normal process conditions, and the volume of the salt solution will also increase. The quality of the aqueous salt solution or brine will also deteriorate as a consequence of the increase in the quantity of contamination in the solution, for instance in the form of dough portions (such as meat particles) and (fractions) of the casing material. It is noted that collection of the aqueous salt solution is understood to mean collection of the aqueous salt solution in the broadest sense of the word i.e. it designates any manner of bringing the solution together.

After some use the total volume of the aqueous solution has increased too much and/or the quality of the aqueous salt solution has deteriorated such that it is no longer usable or has less good properties and discharge is necessary. In order to prevent the contaminated aqueous salt solution now having to be removed as waste, the present invention provides the option of enhancing the quality of the contaminated aqueous salt solution and recycling the reprocessed aqueous salt solution. Since the contaminated aqueous salt solution as described above contains an excess of water, reconditioning of the aqueous salt solution according to the present invention during processing step C) will usually comprise forced evaporation of water out of the salt solution, which can be realized in simple manner by heating the salt solution. This heating can for instance take place in combination with an underpressure. The salt solution can be brought to boiling point, but this is not essential. A drawback of heating the aqueous salt solution is that an additional undesired discolouration will hereby occur. The original clear and or yellow/brown aqueous salt solution will colour further brown, which makes it unacceptable for the skilled person in the field to continue dehydration with such a discoloured salt solution. This drawback is however also obviated by the present invention as will be elucidated below. Salt can also be added during the co-extrusion process in order to enhance the quality of the aqueous salt solution, but this provides only a limited solution as the contaminants are not hereby removed from the solution and because in this manner the total volume of the solution increases.

The collected aqueous salt solution is preferably also filtered. This is possible for instance via a paper filter or mechanical sieve, with the purpose of removing contaminants, such as meat portions, proteins or other solid contaminants, from the solution and thus enhancing the quality and lengthening the lifespan of the (reconditioned) solution. It is also possible to remove components from the solution by means of filtration such that discolouration of the solution during (re)conditioning is reduced or reversed, or discolouration is prevented.

In a specific filtration method at least one component is substantially removed from the aqueous salt solution by means of absorption and adsorption. An example hereof is the absorption of cross-linkers which have entered the aqueous salt solution as a result of the dehydrating, whereby discolouration of a salt solution can be reversed or prevented. An alternative which can optionally be applied in combination with absorption or adsorption is filtration in a manner such that by means of absorption or adsorption at least one component is substantially removed from the aqueous salt solution. Active carbon can herein be applied as filtration material.

In another method of combatting discolouration of the salt solution, an additive is added to the aqueous salt solution so as to prevent and/or at least partially reverse discolouration. Such an additive may comprise a strong oxidant, for instance hydrogen peroxide, fluorine, a hydroxyl radical, chlorine, chlorine dioxide, potassium permanganate, and/or ozone. The strong oxidant may also consist of a salt derivative of a strong oxidant, such as for instance sodium percarbonate, calcium peroxide or magnesium peroxide, and/or of an acid derivative, such as for instance peracetic acid or peroxymonosulphuric acid. Coloured particles can be decolourized by means of the additive (for instance by subdividing) or formation of coloured particles in the solution can be prevented. In addition, other contaminants such as proteins are decomposed by the strong oxidant.

In yet another method of preventing or reversing discolouration of the aqueous salt solution, the salt solution is irradiated with a radiation such as ultraviolet. The radiation can act directly on the discolouration during reconditioning, but it is also possible to activate or catalyse an oxidizing agent and/or reactants with the radiation.

The invention also provides a device of the type stated in the preamble, characterized in that the device is also provided with reconditioning means for reconditioning the aqueous salt solution collected by the collecting means and feeding the supply means with a reconditioned aqueous salt solution. With such a device the advantages can be realized as already described in the foregoing with reference to the method according to the present invention; the solution can be reused for a longer period than according to the prior art, without this having to result in unacceptable discolouration of the salt solution, while the salt concentration and the volume of the solution are ensured within determined limits.

In a preferred embodiment of the present invention, the reconditioning means comprise heating means for heating the collected aqueous salt solution. By means of forced evaporation of water out of the solution the salt percentage in the solution is increased, and the volume simultaneously reduced. Alternatives which can optionally be applied in combination with forced evaporation are for instance ultra-filtration, reverse osmosis, electrolysis, deposition, flocculation, sintered metal filtration and so on.

In yet another preferred embodiment, the reconditioning means are provided with dispensing means for feeding an additive to the aqueous salt solution. The dispensing means can be placed in front of the heating means as well as behind the heating means as seen in the flow direction of the solution. In practice the reconditioning means will be disposed parallel to the normal circulation path of the brine, and a quantity of contaminated brine can thus be cleaned (batch-wise) for instance once a day. It is theoretically also possible, however, to envisage incorporating the reconditioning means in the normal circulation path (i.e. they are placed in-line). A batch-wise processing of the contaminated brine is the more obvious if the brine is heated during reconditioning in order to evaporate water. The heating and evaporation of the brine does after all require the necessary time and energy, which would result in-line in great drawbacks. The reconditioning means, optionally in combination with other means, can optionally be provided with irradiating means, and more particularly an ultraviolet source. The reconditioning means can likewise be provided with a filter, for instance a filter suitable for absorption and/or adsorption. The filter can be embodied as a filter for once-only use, for instance of paper, although it is also possible to embody the filter as a reusable filter, for instance in the form of a metal sieve. It is also possible to envisage the combination of a number of filters with different filter characteristics placed in series.

BRIEF DESCRIPTION OF THE DRAWINGS

The present invention will be further elucidated on the basis of the non-limitative exemplary embodiments shown in the following figures, in which.

DETAILED DESCRIPTION OF THE PREFERRED EMBODIMENT

Figure 1:
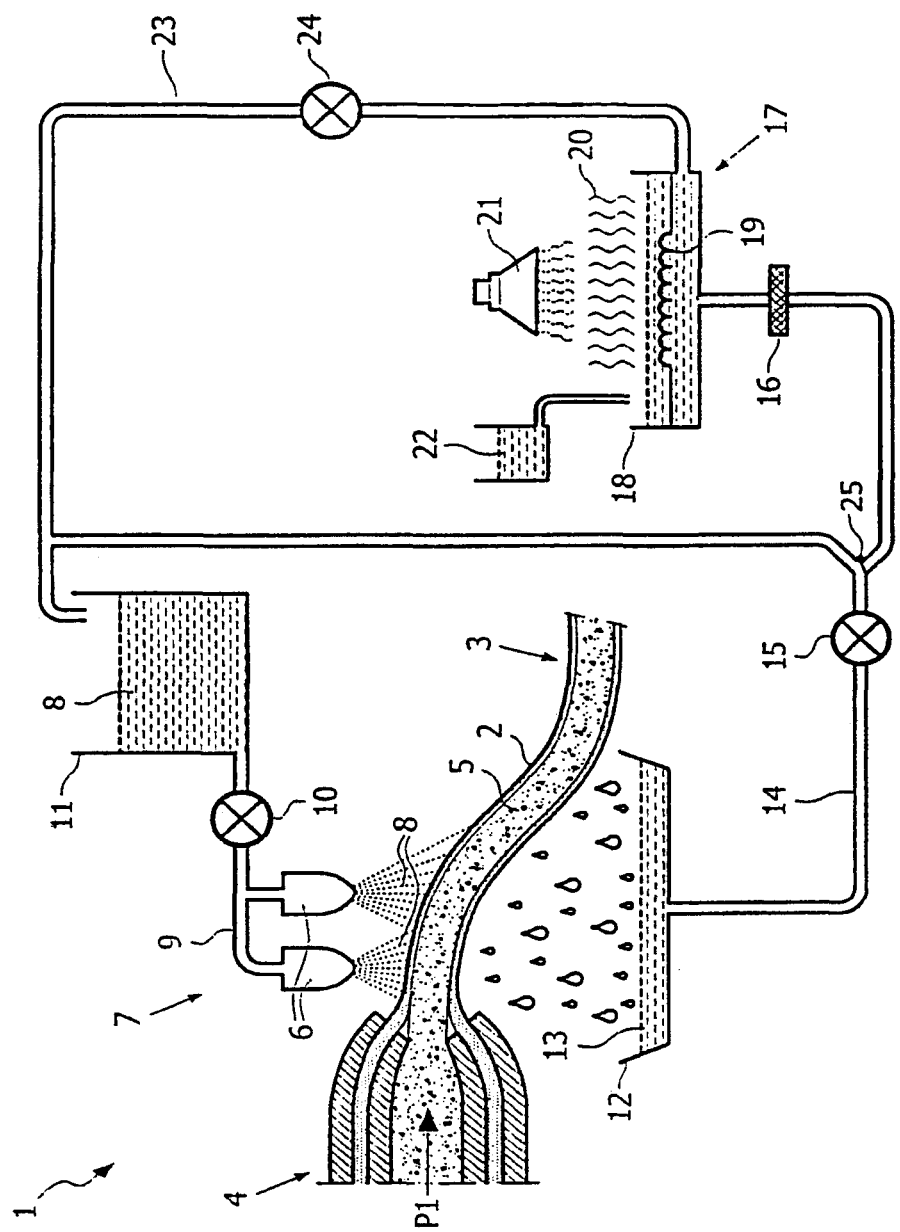
FIG. 1 shows a schematic view of a device according to the invention.

FIG. 1 shows a device 1 for at least partially dehydrating a collagen casing 2 of a co-extruded sausage strand 3. Sausage strand 3 is manufactured by simultaneously extruding (pressing) a strand of meat dough 5 and the collagen casing 2 from an extrusion head 4 in a direction as according to arrow $P_1$. Shortly after leaving extrusion head 4 the casing is still very viscous (soft) and therefore also vulnerable. In order to accelerate curing of casing 2 a highly concentrated brine (aqueous salt solution) 8 is sprayed (atomized) over casing 2 with spray nozzles 6 forming part of a brining system 7. The brine 8 consists for instance of a dipotassium phosphate solution with a concentration of 10-60% by mass, more preferably 36-45% by mass of dipotassium phosphate.

Spray nozzles 8 of the brining system are fed by a feed line 9 to which brine is supplied from a supply tank 11 with brine 8 using a pump 10. Lying under, spray nozzles 8 and sausage strand 3 is a collecting tray 12 with which is collected brine 13 which has been used for the dehydration and which is thereby contaminated. The atomized brine 13 is usually fed back by a discharge pipe 14 and a pump 15 to supply tank 11.

After a time the concentration of dipotassium phosphate in the solution will, as a result of the extraction of water from casing 2, be lower than the initial concentration, and the contamination of the brine with other substances and particles will also increase. By displacing a control valve 25 a part of the (contaminated) brine can be carried batch-wise through a filter (sieve) 16 so as to thus remove contaminants from the brine 13. Filtered brine 13 is then transported to a reprocessing unit 17. The reprocessing unit 17 is provided with a vessel 18 in which heating coil 19 is placed. Through heating of the brine 13 a part of the water will disappear from the brine 13 as water vapour 20. A UV radiator 21 is placed above vessel 18 in order to further stimulate the process of decolourizing of the contaminated brine 13. A feed 22 for an additive also connects onto vessel 18. The brine cleaned and concentrated in the reprocessing unit is finally fed back by a return line 23, and a pump 24, preferably after optional forced cooling of the brine, to supply tank 11, from where the brine 8 once again forms part of the regular circulation circuit of the brine.

Figure 2:
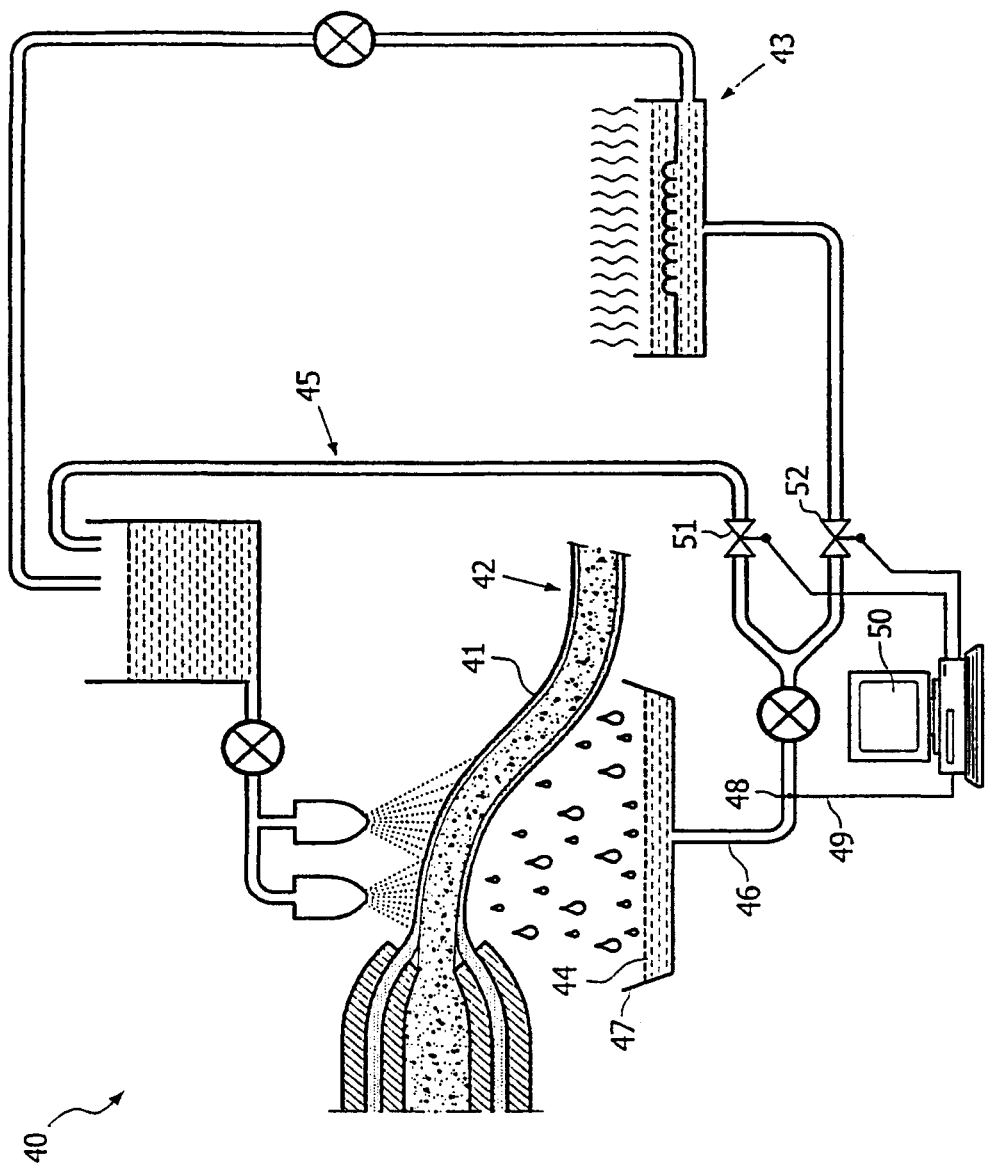
FIG. 2 shows a view of an alternative embodiment variant of a device according to the invention.

FIG. 2 shows a device 40 for at least partially dehydrating a collagen casing 41 of a co-extruded sausage strand 42. In addition to a circuit 43 for reprocessing and recirculating contaminated brine 44, the device 40 is also provided with a return circuit 45. Device 40 is adapted for automated monitoring and adjustment of the quality of the brine present in the device. Placed in an outlet 46 connecting onto a collecting tray 47 for used brine 44 is a sensor 48 with which for instance the concentration of a specific substance, which functions as an indicator for the measure of contamination of brine 44, can be measured and transmitted via a signal line 49 to an intelligent control unit 50. Depending on the level of contamination derived from the value measured by sensor 48, the intelligent control unit 50 will opt to open one of the circuits 43 or 45 by means of operating the valves 51, 52. At a relatively low level of contamination, the used brine 44 will be recycled in untreated state by return circuit 45. When control unit 50 detects that a minimum level of contamination has been exceeded, (a part of) the used brine 44 will be treated by the reprocessing circuit 43 and be recycled. Most probable is that a part of the brine present in device 40 will be guided to reprocessing circuit 43, whereafter device 40 will switch back to "normal" circulation using the return circuit 45. The brine present in reprocessing circuit 43 can even be cleaned (reprocessed), while maintaining this normal circulation, to a higher level than the starting level of the brine. By admixing the brine cleaned to a higher level with the remaining brine present in device 40, the quality of the brine present in the device (and therefore also the brine not carried through the reprocessing circuit 43) will increase. Conversely, it is also possible to envisage the control unit 50 cleaning at least a part of the brine present in device 40 by means of activating reprocessing circuit 43 when normal circulation through device 40 comes to a stop (for instance at the end of working hours). The quality of the brine can thus be increased to a desired level upon restarting of normal circulation through device 40.

What is claimed:

1. A method for at least partially dehydrating a casing of co-extruded food products, comprising the steps of:
   supplying an aqueous salt solution to an exterior of a co-extruded food product;
   collecting the aqueous salt solution supplied to the exterior of the co-extruded food product, wherein the collected aqueous salt solution has an increased measure of contamination relative to the supplied aqueous salt solution;
   monitoring the measure of contamination of the collected aqueous salt solution during the collecting step, and prior to any additional processing; and
   activating a control valve by a control unit based upon the measure of contamination such that one of a plurality of circuits are opened;
   wherein the plurality of circuits include a reprocessing circuit and a return circuit, the return circuit recycling the collected aqueous salt solution without any additional processing;
   wherein a reprocessed aqueous salt solution from the reprocessing circuit is mixed with the collected aqueous salt solution from the return circuit.

2. The method of claim 1 wherein one of a plurality of control valves are activated by the intelligent control unit.

3. The method of claim 1 wherein the collected aqueous salt solution is recycled through the return line when the measured contamination does not exceed a minimum level.

4. The method of claim 1 wherein at least a part of the collected aqueous salt solution is treated by the reprocessing circuit and then recycled when the measured contamination exceeds a minimum level.

5. The method of claim 1 wherein the collected aqueous salt solution is monitored by a sensor placed in an outlet of a collection tray.

6. A method for at least partially dehydrating a casing of coextruded food products, comprising the steps of:
   supplying an aqueous salt solution to an exterior of a co-extruded food product, wherein the exterior of the co-extruded food product is provided with a viscous material, said aqueous salt solution at least partially dehydrating the viscous material on the exterior of the co-extruded food product by removing water from the viscous material;
   collecting the aqueous salt solution supplied to the exterior of the co-extruded food product, wherein the collected aqueous salt solution includes at least excess water removed from the exterior of the co-extruded food product;
   monitoring a measure of contamination of the collected aqueous salt solution, the measure of contamination including at least a relative concentration of the excess water in the collected aqueous salt solution; and
   activating a control valve by a control unit based upon the measure of contamination such that the collected aqueous salt solution is conveyed to a reprocessing unit and reconditioned by at least forced evaporation of the excess water;
   wherein a portion of the collected aqueous salt solution is conveyed to a return line without additional conditioning and subsequently mixed with the reconditioned aqueous salt solution from the reprocessing unit.

7. The method of claim 6, wherein the collected aqueous salt solution is monitored by a sensor placed in an outlet of a collection tray.

* * * * *